(12) United States Patent
Santos et al.

(10) Patent No.: US 10,832,345 B1
(45) Date of Patent: Nov. 10, 2020

(54) SYSTEMS AND METHODS FOR EMPLOYING AUGMENTED REALITY IN APPRAISAL OPERATIONS

(71) Applicant: United Services Automobile Association (USAA), San Antonio, TX (US)

(72) Inventors: Victoria A. Santos, San Antonio, TX (US); Cleburne Robinson Burgess, Fair Oaks Ranch, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

(21) Appl. No.: 16/271,312

(22) Filed: Feb. 8, 2019

Related U.S. Application Data

(60) Provisional application No. 62/628,192, filed on Feb. 8, 2018.

(51) Int. Cl.
| | |
|---|---|
| *G06Q 40/08* | (2012.01) |
| *G06K 9/00* | (2006.01) |
| *G06T 7/00* | (2017.01) |
| *G06K 9/62* | (2006.01) |
| *G10L 15/22* | (2006.01) |
| *G06F 16/583* | (2019.01) |
| *G06F 3/16* | (2006.01) |
| *G06F 40/174* | (2020.01) |

(52) U.S. Cl.
CPC ......... *G06Q 40/08* (2013.01); *G06K 9/00671* (2013.01); *G06K 9/6201* (2013.01); *G06T 7/0002* (2013.01); *G10L 15/22* (2013.01); *G06F 3/167* (2013.01); *G06F 16/5854* (2019.01); *G06F 40/174* (2020.01); *G10L 2015/223* (2013.01)

(58) Field of Classification Search
CPC .. G06Q 40/08; G06T 7/0002; G06K 9/00671; G06K 9/6201; G10L 15/22; G10L 2015/223; G06F 3/167; G06F 16/5854; G06F 40/174
See application file for complete search history.

(56) References Cited

U.S. PATENT DOCUMENTS

| | | | |
|---|---|---|---|
| 10,032,225 B1* | 7/2018 | Fox | G06Q 40/08 |
| 10,373,387 B1* | 8/2019 | Fields | G06Q 40/08 |
| 10,579,749 B1* | 3/2020 | Davis | G06F 30/20 |

(Continued)

*Primary Examiner* — Jacinta M Crawford
(74) *Attorney, Agent, or Firm* — Fletcher Yoder, P.C.

(57) ABSTRACT

A system may include a display and a processor. The processor may receive environment image data representative of an environment and audio data correlated to a portion of the environment image data. The processor may then identify the portion of the environment image data based on the audio data and detect, within the portion of the environment image data, property image data corresponding to one or more pieces of property. The processor may then determine whether the one or more pieces of property are damaged based on a comparison of the property image data and a plurality of images stored in an image database, generate a visualization indicative of damage to the one or more pieces of property, overlay the visualization on the portion of the environment image data, and present the visualization and the portion of the environment image data in the display.

19 Claims, 5 Drawing Sheets

(56) References Cited

U.S. PATENT DOCUMENTS

| | | | |
|---|---|---|---|
| 2016/0147408 A1* | 5/2016 | Bevis | G06F 3/04815 715/850 |
| 2018/0158156 A1* | 6/2018 | Dintenfass | G06Q 50/16 |
| 2018/0159838 A1* | 6/2018 | Dintenfass | H04L 63/083 |

* cited by examiner

SYSTEMS AND METHODS FOR EMPLOYING AUGMENTED REALITY IN APPRAISAL OPERATIONS

CROSS-REFERENCE TO RELATED APPLICATION

This application claims priority to and the benefit of U.S. Provisional Application No. 62/628,192 entitled "SYSTEMS AND METHODS FOR EMPLOYING AUGMENTED REALITY IN APPRAISAL OPERATIONS," filed Feb. 8, 2018, which is hereby incorporated by reference in its entirety for all purposes.

BACKGROUND

The present disclosure relates generally to using augmented reality to assist in various appraisal operations. More specifically, the present disclosure relates to adjusting visualizations depicted via an electronic display to assist in appraisal operations.

Claims adjusters and appraisers may encounter a variety of types of damages when visiting properties. To assist claims adjusters and appraisers in effectively identifying damage at a property and assessing a value for the damage, supervisors may provide feedback to the claim adjusters and appraisers after the adjuster or appraiser provides a report indicative of the adjuster's or appraiser's assessment. Traditional appraisal and assessment operations may involve numerous iterations and separate communications that can be inconvenient and cumbersome. To better enable the adjusters and appraisers to perform their job tasks, it may be desirable to provide improved communication devices to better equip these individuals to perform appraisal services on actual property damage.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a display and a processor. The processor may receive environment image data representative of an environment and audio data correlated to a portion of the environment image data. The processor may then identify the portion of the environment image data based on the audio data and detect, within the portion of the environment image data, property image data corresponding to one or more pieces of property. The processor may then determine whether the one or more pieces of property are damaged based on a comparison of the property image data and a plurality of images stored in an image database, generate a visualization indicative of damage to the one or more pieces of property, overlay the visualization on the portion of the environment image data, and present the visualization and the portion of the environment image data in the display.

In another embodiment, a method may include receiving audio data associated with one or more pieces of property and identifying one or more documents associated with a policy related to the one or more pieces or property based on the audio data. The one or more documents are identified based on a detection, in the audio data, of one or more key words associated with the one or more pieces of property. The method may then involve generating one or more visualizations based on the one or more documents and presenting the one or more visualizations over image data associated with the one or more pieces of property using an electronic display.

In yet another embodiment, a non-transitory computer-readable medium comprising computer-executable instructions that when executed cause a processor to receive baseline image data representing one or more portions of a structure via an image sensor at a first time. The processor may then overlay the baseline image data over image data acquired by the image sensor after the baseline image data was acquired, such that the image data is representative of the one or more portions of the structure. The processor may also identify damage to one or more portions of the structure based on a comparison between the baseline image data and the image data, determine an estimate of costs associated with the damage based on the damage, generate a visualization based on the estimate, and overlay the visualization over the image data for display on an electronic display.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
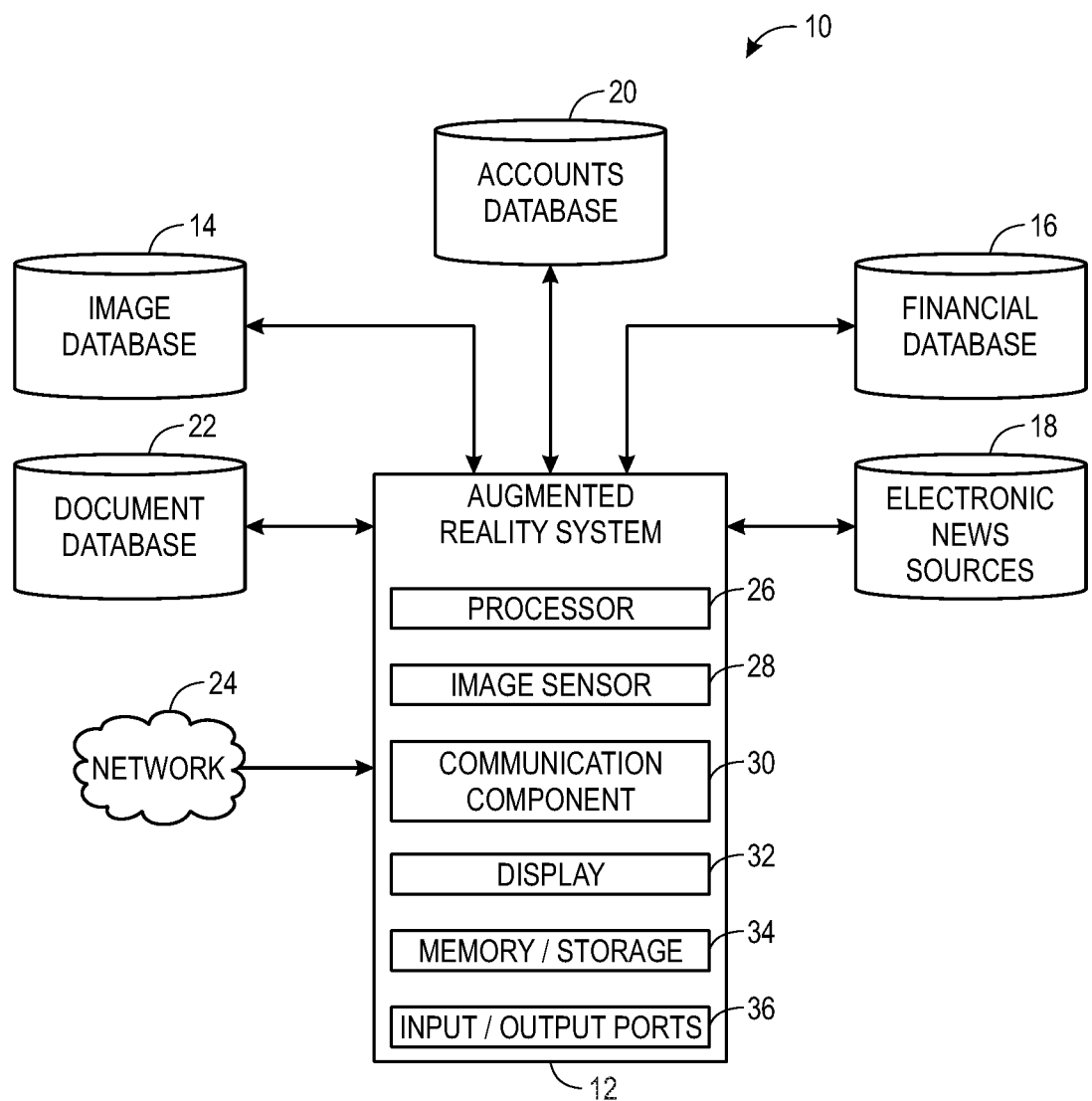
FIG. 1 illustrates a block diagram of a system that includes an augmented reality system communicatively coupled to a number of data sources, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Claims adjusters and appraisers may typically visit different types of property to assess and document damage that may have occurred to the property, interview property owners regarding the damage, and collect other relevant information related to a potential claim from an insurance company or the like. When visiting various sites, the claim adjusters may not be able to properly document each damaged object, accurately assess the expected costs related to the damage, and the like. In addition, when receiving inquiries (e.g., via web, phone call, in person), it may prove to be difficult for the claims adjuster to recall specific details with regard to a client's account information (e.g., contract terms, deductible), to perform certain tasks (e.g., obtaining measurements), to collect the desired type of information (e.g., pictures, angles, statements from client), and the like. Moreover, as individuals increasingly attempt to file fraudulent claims, organizations that insure various types of properties may request increasing amounts of information from claim adjusters and appraisers to ensure that the respective claims are not fraudulent.

As the tasks performed by claim adjusters and appraisals become increasingly difficult, various electronic devices (e.g., smart phones, optical head-mounted display) that enable users to acquire information regarding the surrounding environment with relative ease have become more available. In present embodiments, the electronic devices may communicate with various databases to acquire information or data regarding a certain object and display the information via an electronic display for the user to view. In present embodiments, image data acquired by image sensors of the electronic device may be modified to include data regarding the object being captured by the image data. The resulting image or augmented image data may be useful in presenting data regarding the object while also presenting the object in view of the user.

With the foregoing in mind, in some embodiments, a wearable electronic device (e.g., electronic glasses) may be employed to provide visualizations or audio to the user of the device while performing his tasks. For example, the wearable electronic device may present digital objects over real objects in an augmented reality to provide additional information regarding property being inspected by the user. In another embodiment, audio data may be provided to the user based on image data collected from the mobile computing device or based on audio detected via the mobile computing device. The audio data may give the user guidance or assistance in performing his tasks. As such, the wearable electronic device may access information related to the property being inspected or appraised from other data sources, such as databases and the like, to provide the user with information that may not be readily available to the user and may help the user perform his job more efficiently and effectively. Additional details with regard to using a wearable electronic device to collect information regarding property, receive guidance for performing various tasks, generate documentation related to certain operations, and the like will be discussed below with reference to FIGS. 1-5.

By way of introduction, FIG. 1 is a block diagram of a system 10 that includes an augmented reality system 12, an image database 14, a financial database 16, electronic news sources 18, an accounts database 20, a document database 22, a network 24, and the like. Although the augmented reality system 12 is illustrated as being coupled to five databases in FIG. 1, it should be noted that the augmented reality system 12 may be communicatively coupled to a variety of data sources that may assist the augmented reality system 12 in performing the embodiments described herein. The augmented reality system 12 may include any suitable computer device, such as a general-purpose personal computer, a laptop computer, a tablet computer, a mobile computer, a smart phone device, electronic glasses, and the like that is configured in accordance with present embodiments. The augmented reality system 12 may include various types of components that may assist the augmented reality system 12 in performing various types of computer tasks and operations. For example, the augmented reality system 12 may include a processor 26, one or more image sensors 28, a communication component 30, a display 32, memory/storage 34, an input/output (I/O) port 36, and the like.

The processor 26 may be any type of computer processor or microprocessor capable of executing computer-executable code. The processor 26 may also include multiple processors that may perform the operations described below. The image sensor 28 may be a sensor capable of acquiring image data surrounding (e.g., environment) the augmented reality system 12. As such, the image sensor 28 may be a camera or other suitable image capturing device (e.g., scanner).

The communication component 30 may be a wireless or wired communication component that may facilitate communication between the augmented reality system 12, databases, and various other computing systems via a network, the Internet, or the like. The display 32 may depict image data acquired by the image sensor 28 and visualizations associated with software or executable code being processed by the processor 26. In one embodiment, the display 32 may be a touch display capable of receiving inputs from a user of the augmented reality system 12. The display 32 may be any suitable type of display, such as a liquid crystal display (LCD), plasma display, or an organic light emitting diode (OLED) display, for example. Additionally, in one embodiment, the display 32 may be provided in conjunction with a touch-sensitive mechanism (e.g., a touch screen) that may function as part of a control interface for the augmented reality system 12. In another embodiment, the display 32 may include a transparent glass material that allows a user to view his surroundings, while the processor 26 may display visualizations on the transparent glass material, such that the visualizations may be viewable along with the surroundings. Alternatively, the display 32 may be an optical headset that receives image data of the user's surroundings and generates visualizations that augment or change the image data depicted to the user.

The memory and the storage 34 may be any suitable articles of manufacture that can serve as media to store processor-executable code, data, or the like. These articles of manufacture may represent computer-readable media (e.g., any suitable form of memory or storage) that may store the processor-executable code used by the processor 26 to perform the presently disclosed techniques. As used herein, applications may include any suitable computer software or program that may be installed onto the augmented reality system 12 and executed by the processor 26. The memory and the storage 34 may represent non-transitory computer-readable media (e.g., any suitable form of memory or storage) that may store the processor-executable code used by the processor 26 to perform various techniques described herein. It should be noted that non-transitory merely indicates that the media is tangible and not a signal. The I/O ports 36 may be interfaces that may couple to other peripheral components such as input devices (e.g., keyboard, mouse), sensors, input/output (I/O) modules, and the like. It should be noted that the components described above with regard to the augmented reality system 12 are exemplary components and the augmented reality system 12 may include additional or fewer components than shown.

In certain embodiments, the augmented reality system 12 may be communicatively coupled to the image database 14, the financial database 16, the electronic news sources 18, the accounts database 20, and the document database 22 via the communication component 30. The image database 14 may include a collection of images regarding various objects, products, and the like. The images may have been acquired by scraping the Internet or other image content for various images and information related to the images. For example, the images may include images depicted in product websites, images acquired by individuals and stored on social media, images presented in advertisements, and the like. In one embodiment, the image database 14 may also include data (e.g., metadata) regarding various images. The data may include details regarding the image or the object depicted in the image. The data may include a product name, a product type, a product manufacturer, an industry associated with the product, a link to a particular organization, and the like.

The image database 14 may also include baseline image data related to one or more individuals' homes, property, or equipment. That is, a user of the augmented reality system 12 may acquire image data via the image sensor 28 that may provide an initial state or a current state of pieces of properties owned by the user. By way of example, the user may acquire image data of the user's home, various products owned by the user, furniture within the user's home, and the like. This baseline image data may be stored in the image database 14 and used to determine whether damage occurred to the items depicted in the baseline image data at a later time. In some embodiments, the baseline image data may also provide an inventory or collection of images that represent one or more items owned by the user at the time that the image data was acquired, the condition of the respective items at the time that the image data was acquired, and the like.

The financial database 16 may include financial or investment data associated with different organizations, manufacturers, or the like. As such, the financial database 16 may include estimate costs for various products and services by different organizations or manufacturers. Generally, the augmented reality system 12 may determine a manufacturer or organization that is associated with an object depicted in image data via the image database 14 and retrieve financial information regarding the product or service involved to repair or replace property via the financial database 16. In one embodiment, this determination of the manufacturer or organization is performed by comparing the object depicted in the image data with a number of other similar shaped objects present in images stored in the image database 14 and retrieving the manufacturer or organization information associated with the images that include the similar shaped objects. That is, the images in the image database 14 may include metadata that may store information related to the manufacturer or organization associated with the object in the respective image data.

In certain embodiments, an outline of the object depicted in the image may be form a shape. The formed shape may be compared to shapes stored in the image database 14. By way of example, the outlined shape may be scaled to a certain size (e.g., length, width) and overlaid on the shapes stored in the image database 14 until a match or substantially matching shape is identified. In other embodiments, one or more pixels of the acquired image may be compared to respective pixels of images stored on the image database 14 until a substantially matching group of pixels have been identified.

In some embodiments, the acquired image data may include a piece of property, a building material (e.g., sheetrock, flooring, carpet), or the like. The financial database 16 may thus include estimated costs by certain organizations to repair or replace the piece of property, the building material, or the like. By way of example, financial database 16 may include data related to the cost to repair or replace sheet rock. As such, the augmented reality system 12 may use image data that may include a depiction of water damage to a panel of sheet rock to query the financial database 16 to identify the estimated costs for repairing a similar sized panel of sheet rock. For instance, the augmented reality system 12 may compare the image data having the panel of damaged sheet rock to the images in the image database 14 to determine that the image includes damaged sheet rock. Using the images in the image database 14, the augmented reality system 12 may determine the dimensions of the sheet rock panel in the image based on a comparison of various sized sheet rock panels. The augmented reality system 12 may then query the financial database 16 to determine the costs associated with purchasing the new sheet rock panel and replacing the previous sheet rock panel with the new sheet rock panel.

The accounts database 20 may include account information related to a number of accounts within one or more financial institutions. A user of the augmented reality system 12, for example, may have account data stored in the accounts database 20. The account data may include one or more balances for one or more accounts associated with a respective user, a credit limit for the respective user, a debt-to-asset ratio for the respective user, a risk profile for the respective user, and the like. The risk profile for a user may provide an indication with regard to a level of investment risk or aggressiveness that the corresponding user may have pre-defined to the financial institution. The account data may also include additional information for the user, such as an age, occupation, salary level, income, and other information that may be useful to determine a risk level for a user. In some embodiments, the risk level for a user may be determined based on an amount of income, an amount of savings, an age (e.g., with respect to a desired retirement age), and the like.

In addition to the information listed above for the account data, the account data may also include information regarding investments that are owned by a user. For example, the account data may include a list of stocks, mutual funds, tax-deferring funds, and the like that are owned by the user. In addition, the account data may include a base value or initial value that the user invested in each appropriate investment. In this manner, the account data may be used to determine capital gains or losses for various investments. Other account data for investments may include yield or dividend information for a respective investment and the like. Thus, the accounts database 20 may include a collection of information concerning liquid assets and non-liquid assets for various account holders.

The document database 22 may include a collection of documents or information that are related to the user of the augmented reality system 12. By way of example, the document database 22 may include documents regarding insurance policies held for various pieces of property owned or leased by an individual, an organization, or the like. In some embodiments, the document database 22 may be linked to the account database 20 to provide additional data regarding the assets, the liabilities, and the insurance policies held by an individual or organization.

Although the image database 14, the financial database 16, the accounts database 20, and the documents database 22 are described as separate databases, it should be noted that, in some embodiments, each of these databases may be implemented by one, two, three, or any suitable number of databases. Moreover, it should be noted that the databases may be accessible via the network 24, a direct communication link, or any suitable communication channel.

Referring now to the augmented reality system 12, a user of the augmented reality system 12 may acquire image or video data of an object by pointing the image sensor 28 to the object located in the viewing presence of the augmented reality system 12. In response, the display 32 may present image data of the object being observed by the image sensor 28. In certain embodiments, the augmented reality system 12 may use the acquired image data to query the image database 14 and retrieve product and/or material data regarding the object. After retrieving the product and/or material data, the augmented reality system 12 may identify financial information related to the object depicted in the image data based on the product and/or material data. The augmented reality system 12 may query the financial database 16 to retrieve financial information related to the product and/or material data and generate one or more visualizations to overlay the depicted image data of the display 32. The visualizations may include the financial data and, in some embodiments, interactive options that may allow a user to access additional information or perform additional actions with regard to the object.

For example, based on information in the financial database 16, the augmented reality system 12 may present a breakdown of the costs associated with a repair or replacement of property. The augmented reality system 12 may then generate visualizations that represent the repair costs to overlay on the image data being depicted on the display 32. This real-time retrieval and presentation of financial data and financial estimate may provide useful information to the user when considering claim options.

In addition to the image database 14, the financial database 16, the accounts database 20, and the document database 22, the augmented reality system 12 may be communicatively coupled to other data sources. For example, the augmented reality system 12 may be communicatively coupled to the electronic news sources 18, which may include data regarding various manufacturers and organizations that may be published via news outlets. In addition, the augmented reality system 12 may be coupled to the network 24, which may include the Internet or other suitable networks that may be queried for information regarding various products, objects, manufacturers, organizations, and the like. The electronic news sources 18 and the other sources of information communicatively coupled to the augmented reality system 12 via the network 24 may provide additional information that may be used to update the estimate costs for repairing and replacing items depicted in acquired image data.

Keeping the foregoing in mind, the present embodiments described herein may enable claim appraisers and adjusters to employ the augmented reality system 12 as wearable electronic devices that may provide the ability to capture and store image data (e.g., photos and videos) of damage sustained by property without having to utilize a manual upload process. That is, field adjusters or appraisers may utilize a manual process to write estimate details, such as category selection, item code, and measurements. By using the augmented reality system 12 described herein, the adjusters or appraisers may replace this manual process with the ability to speak commands into the augmented reality system 12 and overlay digital information on captured images, such that the adjuster will be able to work through the estimate writing experience more efficiently.

By way of example, in some embodiments, a user (e.g., field adjuster) may employ the augmented reality system 12 to automatically capture image data, such as photos, of a property as the user visits a site. While the user walks a site to assess property damage, the augmented reality system 12 may collect image data and use image recognition technology to identify damaged property. In some embodiments, the augmented reality system 12 may be directed to identify or record certain property as damaged based on voice commands received from the user.

Image or audio data captured through the augmented reality system 12 can be fed into a database (e.g., image database 14), a cloud-computing device, or some other suitable computer component (e.g., financial database 16), which may glean additional information related to the objects or damage depicted in the image or audio data. For example, the augmented reality system 12 may receive image data related to a pipe that sustained damage. After receiving image data of the pipe, the augmented reality system 12 may use image recognition technology to determine that the pipe is damaged based on images stored on the image database 14. The documentation process for damaged pipes may involve collecting certain types of information such as a determination as to the type of damage (e.g., break, leak), other objects (e.g., sheetrock, furniture) damaged due to the damaged pipe, a measurement of the pipe, a description of the damage, and the like. By employing the augmented reality system 12 described herein, the user may receive information regarding the damaged pipe via various data sources accessible through the network 24, which provide connectivity to relevant information using the results of the image recognition technology, previously created documentation for similarly damaged pipes, Internet scraping operations (e.g., to determine replacement/expected cost estimate), and the like. The received information may be presented in the display 32 of the augmented reality system 12. The augmented reality image of the digital visualizations overlaid on the real objects may be saved and stored for documentation related to the appraisal or claim assessment.

Figure 2:
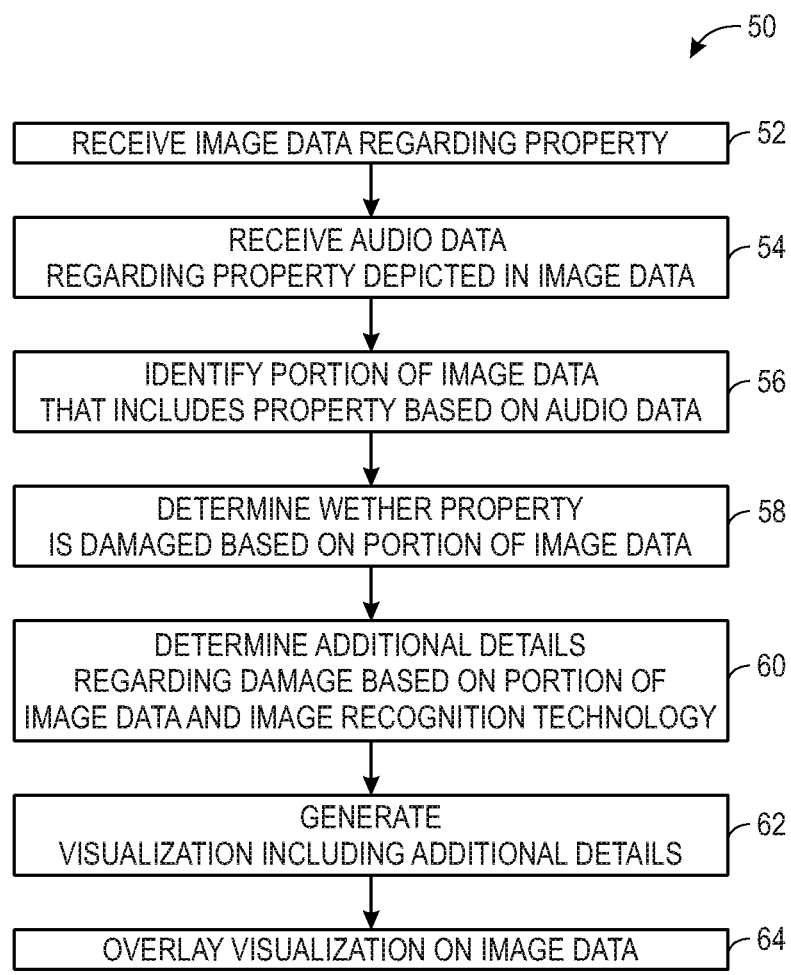
FIG. 2 illustrates a flow chart of a method for presenting visualizations related to damaged property using the augmented reality system of FIG. 1, in accordance with embodiments described herein.

With the foregoing example in mind, FIG. 2 illustrates a method 50 that may be employed by the processor 26 of the augmented reality system 12 to present visualizations related to damaged property using the augmented reality system 12. Before proceeding, it should be noted that the method 50 described below is described as being performed by the processor 26 of the augmented reality system 12, but the method 50 may be performed by other suitable computing devices. In addition, although the method 50 is described in a particular order, it should be understood that the method 50 may be performed in any suitable order.

Referring now to FIG. 2, at block 52, the processor 26 may receive image data regarding a property. The image data may be pictures or video acquired via the image sensor 28 of the augmented reality system 12. The image data may be acquired as the user of the augmented reality system 12 walks around the premises of a property (e.g., structure, building), within the property, and the like.

As the user walks around, the processor 26 may receive audio data from the user at block 54. The audio data may include spoken commands or detected speech spoken by the user or other individuals within a proximity to the augmented reality system 12. The audio data may include details that specify a piece of property, an item or product located within the property, a structural component (e.g., sheet rock) regarding the property, or the like. Generally, the audio data may provide some indication with regard to an item of interest to the user while the user is looking at image data that includes the item of interest. In addition, the audio data may include trigger words that correspond to known objects present in a structure or outside a structure associated with the owner of the structure or the like.

At block 56, the processor 26 may identify a portion of the image data that includes the item specified in the audio data. By way of example, the user may be viewing a living room of a home and speak a command to indicate that a couch in the living room has sustained damage. After detecting the command or the speech identifying some item or product in the home, the processor 26 may begin the process to search different portions of the image data currently being acquired by the image sensor 28 to identify the requested item. As such, the processor 26 may query the image database 14 for a reference image related to the item. In some embodiments, the image database 14 may have a collection of images that correspond to different types or shapes associated with the item. Alternatively, the image database 14 may include baseline image data associated with the user that includes a reference image of the couch that was present in the living room at an earlier time.

Using the reference image, the processor 26 may cross reference the reference image with the items detected in the current image data. The processor 26 may employ image recognition technology to identify the requested item in the image data by comparing the shape, outline, or other physical property of the reference image with various items depicted in the current image data.

After identifying the portion of the image data that includes the requested item, at block 58, the processor 26 may determine whether the item within the portion of the image data is damaged. As such, the processor 26 may compare the item depicted in the image to the baseline image data that includes the item, an image of the item accessed via the image database 14, or the like. In some embodiments, the processor 26 may send the image data to a computing device (e.g., cloud-computing device) to perform the analysis described herein. In any case, the processor 26 may analyze the item depicted in the image data to detect for damage due to wear, water, debris, disfiguration, changed colors, stains, and the like.

If damage is detected on the item by the processor 26, the processor 26 may, at block 60, determine additional details regarding the item or the type of damage sustained by the item. In one example, the additional details may include an assessment of a type of damage sustained by the item. To make this assessment, the processor 26 may compare the portion of the image data that includes the damaged items to other images in the image database 14 that correspond to various types of damage that may be sustained by the item. As such, the image database 14 may include a collection of images of different items and a variety of states of damage or types of damage associated with each item depicted in each image. In some embodiments, the user may indicate a type of damage sustained by the item depicted in the image data via speech detected by the augmented reality system 12.

The additional details may also include dimension data such as a length of the item. In this case, the augmented reality system 12 may determine dimension data regarding the item using sensors within the augmented reality system 12, image analysis, or the like. Additional details with regard to using the augmented reality system 12 to perform various measurement operations are discussed below with reference to FIG. 3.

In some embodiments, the additional details may also include a manufacturer name, a product identification number, or some identifying information related to the item depicted in the image data. For example, the processor 26 may determine a model number or determine the manufacturer of the item based on images stored in the image database 14 and related image recognition technology. For example, an image of a television may be identified as corresponding to a particular model and as being damaged (e.g., a hole may be identified in a screen of the television). The processor 26 may compare the received image data to images available via the Internet to determine an approximate price for the item. The obtained price may then be used to populate documentation related to the claim appraisal report, generate a visualization of the price to be overlaid on the image data of the item, and the like.

At block 62, the processor 26 may generate a visualization that includes the details determined at block 60. The visualization may include text that indicates a type of damage sustained by the item as determined by the processor 26 using the image database 14 or as determined by the user of the augmented reality system 12. In some embodiments, the visualization may provide an indication (e.g., arrow) that highlights or points to the damage in the item depicted in the portion of the image data. In addition, the visualization may specify the name of the item depicted in the image data, a product number for the item, an estimated replacement cost for the item, or the like.

At block 64, the visualization may be overlaid on the image data depicted or presented to the user of the augmented reality system 12. As such, the visualization may provide additional details regarding items in the property that may assist a claims appraiser, an adjuster, or a policy holder to generate documentation or exhibits that chronicle the damage related to a claim to an insurance policy or the like.

In some embodiments, the method 50 may be performed automatically without receiving audio data at block 54. That is, as the user of the augmented reality system 12 surveys a property, the processor 26 may compare the acquired image data to baseline image data stored in the image database 14 or other suitable storage component. Based on the comparison, the processor 26 may determine whether a state of various items in the property has changed and perform the operations described above in blocks 56, 58, 60, 62, and 64 without receiving an audio command from the user. Additional details with regard to using the baseline image for a property to assess damage estimates will be discussed below with reference to FIG. 5.

In addition, the augmented reality system 12 may provide virtual tools, such as measuring equipment, to obtain measurement data regarding objects in the image data. In one example, a digital ruler or measuring tape may be overlaid on the image data to determine the length of an object, an extent of damage to the object, and the like. In another embodiment, the augmented reality system 12 may include one or more location sensors capable of receiving distance or location data, such as infrared sensors, that may be used to determine the distance between two or more points on the object, between the user and the object, and the like. As such, the augmented reality system 12 may be capable of measuring a distance from an item to the user and using the distance as a reference point for other measurements.

Figure 3:
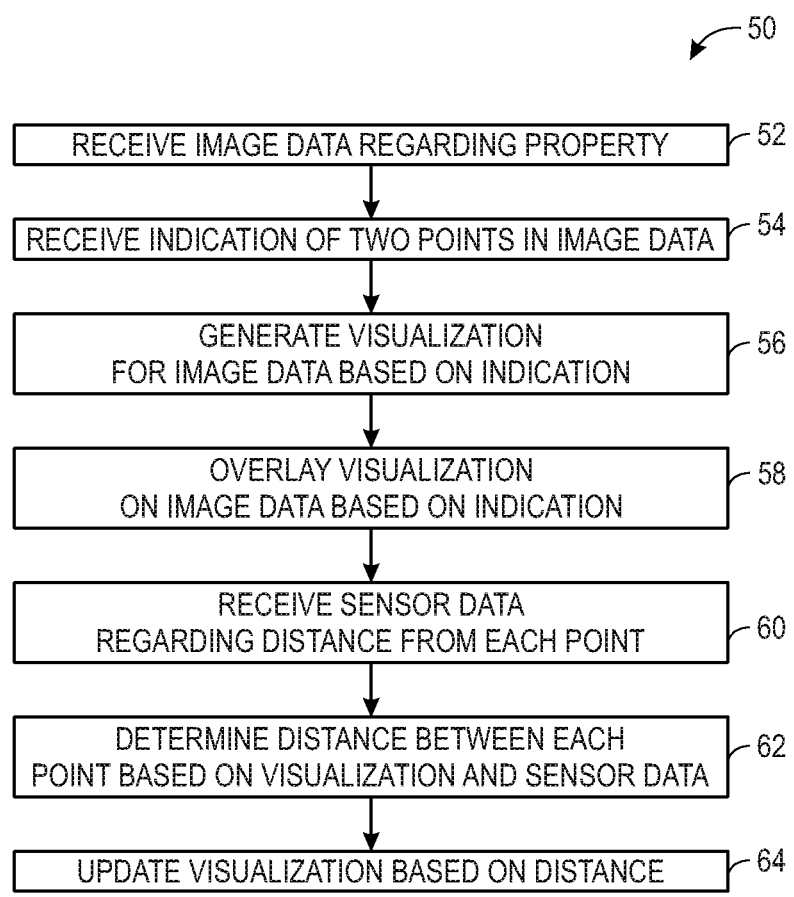
FIG. 3 illustrates a flow chart of a method for providing visualizations indicative of distance of real objects via the augmented reality system of FIG. 1, in accordance with embodiments described herein.

With the foregoing in mind, FIG. 3 illustrates a flow chart of a method 70 for providing visualizations indicative of distance of real objects via the augmented reality system 12. As discussed above with reference to the method 50, it should be noted that the method 70 described below is described as being performed by the processor 26 of the augmented reality system 12 but may be performed by other suitable computing devices. In addition, although the method 70 is described in a particular order, it should be understood that the method 70 may be performed in any suitable order.

Referring now to FIG. 3, at block 72, the processor 26 may receive the image data representative of a piece of property, as described above with respect to block 52 of FIG. 2. At block 74, the processor 26 may receive an indication of two or more points within the image data. The two or more points may correspond to two or more positions associated with dimensions (e.g., length, width) of an object depicted in the image data, two different objects depicted in the image data, two positions on the image data representative of two points in a surrounding of the user, and the like. In some embodiments, the indications of the points may be received via the display 32 or any other suitable user interface component that enables the user of the augmented reality system 12 to provide inputs to the processor 26.

At block 76, the processor 26 may generate a visualization for the image data based on the indication. The visualization may correspond to a line or a shape created by the points provided in block 74. The visualization may assist the user to determine a dimension or measurement associated with the two or more points provided in block 72. For example, the visualization may represent a ruler or measuring tape that provides measurement units to assist the user to determine distances between the points.

At block 78, the processor 26 may overlay the visualization on the image data received at block 72. The visualization may be overlaid to connect the two or more points and may include measurement data indicative of a total length between two points. However, the measurement data may be provided after certain calculations and measurement data is received.

Keeping this in mind, at block 80, the processor 26 may receive sensor data regarding distance from each point provided in block 74. Referring back to the augmented reality system 12 of FIG. 1, in some embodiments, the augmented reality system 12 may include one or more sensors for acquiring various types of data. By way of example, the sensors may include an infrared sensor, an acoustic sensor, optical sensors, laser sensors, and the like. The sensor data received at block 74 may thus include data indicative of a distance between the augmented reality system 12 and each respective point.

Based on the sensor data, at block 82, the processor 26 may determine a distance between each point received in block 74. The determined distance corresponds to the real world distance between the points, as opposed to the distance between the points with respect to the visualization overlaid on the image data. In some embodiments, the processor 26 may use certain triangulation distance measurement analysis to determine the distance between two points based on the distance between the augmented reality system 12 and each point, as provided by the sensor data.

At block 84, the processor 26 may update the visualization to include the distance data determined at block 82. The distance data presented on the visualization may assist the user (e.g., appraiser) with determining details with regard to damage incurred by a piece of property and to determine estimated costs for repairing the damage.

In addition to providing measurement data, the augmented reality system 12 may use digital overlays to present claim information, training documents, external data, and other types of information via the display 32. For example, a desk adjuster, who receives a phone call, may use a computing device to receive audio data related to a claim. The computing device may also present visualizations that may be useful to the desk adjuster when assisting a client with processing a claim. In one example, the computing device may receive voice commands from the desk adjuster to retrieve information (e.g., contract information) related to the client, the property covered by a policy, and the like. That is, the computing device may use intelligent call listening to detect when the adjuster may use certain information that may assist the adjuster in facilitating the requests of the client without soliciting or waiting for specific commands from the adjuster. As such, the computing device may provide just-in-time information to adjusters in order to streamline claims discussions and reduce handle time.

Figure 4:
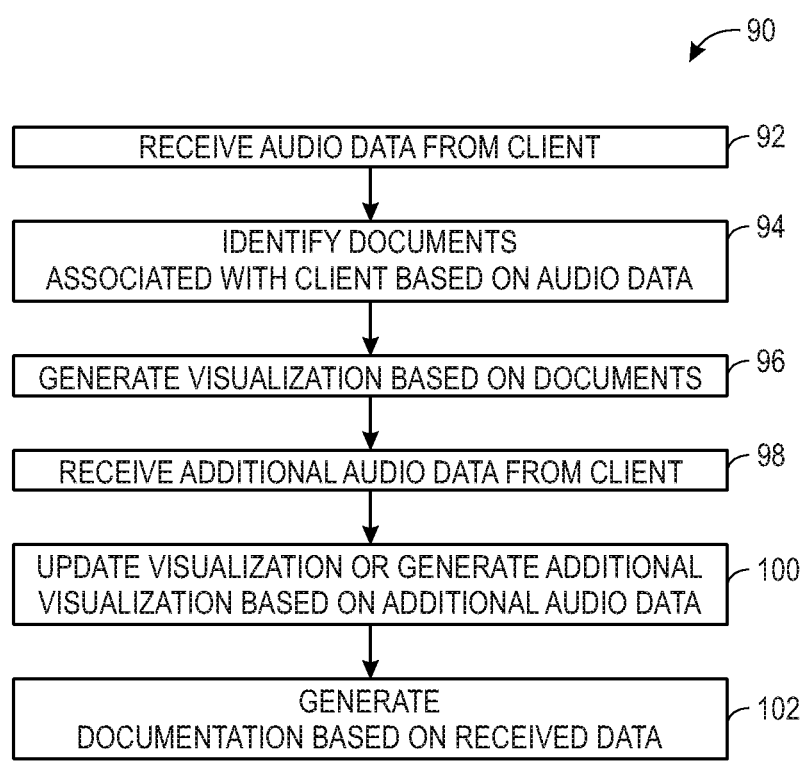
FIG. 4 illustrates a flow chart of a method for retrieving data regarding real objects via the augmented reality system of FIG. 1, in accordance with embodiments described herein.

With this in mind, FIG. 4 illustrates a flow chart of a method 90 for retrieving data regarding real objects via the augmented reality system 12. As discussed above with reference to the method 70, it should be noted that the method 90 described below is described as being performed by the processor 26 of the augmented reality system 12 but may be performed by other suitable computing devices. In addition, although the method 90 is described in a particular order, it should be understood that the method 90 may be performed in any suitable order.

Referring now to FIG. 4, at block 92, the processor 26 may receive audio data from a client or individual that is requesting assistance in preparing a claim on an insurance policy based on damage to property owned by the individual. The audio data may be received via a telephone call, video chat, or any suitable communication means. In one example, the audio data may pertain to audio recorded or monitored in real time during a call with a representative of the organization that provided the insurance policy.

As the audio data is received, at block 94, the processor 26 may identify documents associated with the client based on the audio data. That is, the processor 26 may detect key words and/or phrases that may provide some insight into the request for assistance or the inquiry provided by the individual. In some embodiments, the processor 26 may include reference materials that specify a relationship between certain key words and documents that relate to these key words. For example, the organization providing the insurance policy may provide a list of key words or phrases that correspond to different documents associated with the insurance policy. The documents may include an incident report that details the claim, damage report that details the sustained damage, estimated costs report that chronicles estimates, payment report that documents payments paid, and the like.

In certain embodiments, the processor 26 may receive input from an adjuster or other individual participating in the conversation related to the audio data. The input may include an indication of a document to present to the adjuster based on the request provided by the client. That is, as the client discusses his request, the adjuster may provide an input that indicates a particular document or information that the adjuster commands the processor 26 to acquire. In some embodiments, the processor 26 may monitor the audio data and the documents requests received by the processor 26. Based on a correlation between the requested documents and the received audio data, the processor 26 may generate the reference material that specifies the relationship between key words and certain documents. It should be noted that as subsequent audio data files are received and the adjuster retrieves certain documents via the processor 26, the processor 26 may employ certain machine learning algorithms to confirm whether the relationship between the key words and the documentation identified by the processor 26 at an earlier time was correct. The processor 26 may continue to refine this relationship and update the reference material based on adjuster inputs and corresponding audio data monitored over time.

At block 96, the processor 26 may generate visualizations based on the documents identified at block 94. The visualizations may include a transparent version of the document that may be presented via the display 32, a scaled version of the document that may be readable via the display 32, or the like. In some embodiments, the visualizations may include fields of the related document. As such, the entire document may not be presented via the display 32; instead portions of the document that correspond to fields for data to be acquired or entered may be presented to assist the adjuster in facilitating the request from the client.

In some embodiments, the documents may also include informational documents that detail the coverage or policy that the individual is entitled to. In this case, the documents presented to the adjuster may assist the adjuster to provide relevant information to the client without specifically providing an input that requests the information. Moreover, by automatically identifying the relevant documents, the processor 26 may preserve computer resources from coordinating interactions between the adjuster and the processor 26 via a user interface or the like.

At block 98, the processor 26 may receive additional information from the client via additional audio data acquired by the processor 26. The additional information may provide details or information that correspond to data that may be entered or input into the document identified at block 96. For example, if the identified document corresponds to a form with fields that requested information from the client, the additional information may be used to populate the fields based on prompts provided by the adjuster. As such, the processor 26 may monitor the additional audio data to determine a relationship between the words spoken by the client and the requests provided by the adjuster to determine the information to add to a particular field of the document. It should be noted that the machine learning techniques described above may also be employed here to refine or improve the relationship between the key words or requests provided by the client or the adjuster and the corresponding fields in a document.

At block 100, the processor 26 may update the visualization to include the additional information. The adjuster may then use the updated visualization to confirm the details stored in the document with the client or generate additional documentation with the information collected during the operation of the method 90. As such, at block 102, the processor 26 may generate documentation that may assist the adjuster and the client to facilitate a claim or other operation related to a policy held by the client.

With the foregoing in mind, it should be noted that adjusters may use a mobile or desktop computer to input documentation in a loss report, causing the adjuster to often have to juggle multiple hardware devices along with the adjusting tool on-site. By employing the embodiments described in the method 90, the adjuster may capture claims documentation without having to physically input the information via a laptop or desktop keyboard. That is, the computing devices described herein may receive voice commands from the adjuster (e.g., instead of from the client) and the digital overlays to document a claim or estimate. As such, the image data acquired via the wearable electronic device, the information received from the cloud-computing device based on the image data, and the other types of data described herein may be used to populate or generate documentation related to a claim based on voice commands provided to the respective computing device. As such, the adjuster may focus on collecting relevant data related to the damage instead of inputting the information into appropriate documentation.

In addition to providing information related to performing a task or facilitating a request from a client, the processor 26 may be used to perform other operations such as detect the potential existence of fraud during the operations of the methods 50 or 70. For instance, the processor 26 may receive audio data while the adjuster converses with a client regarding a claim or damage to a property. In some embodiments, the processor 26 may detect voice inflections or characteristics that may be associated with a lie or a person being dishonest. Here, the processor 26 may make a digital note on a file or record associated with the claim for the adjuster to seek additional information to assess whether the claim is potentially fraudulently based. The digital note may be presented as a visualization in the display 32 for the adjuster to perform additional security measures to verify the content of the audio data.

In another embodiment, the processor 26 may generate an audible or visual alert that may be received by the user of the augmented reality system 12 in the form of electronic glasses. In this way, the visual alert may be presented to the user but may be unavailable to others in the presence of the user. In this way, the user may be alerted to a possible fraudulent action by a client without providing any indication to the client that the user is aware or may suspect fraud. The processor 26 may detect the possibility of fraud when the client provides information that conflicts with the image data or audio data that was previously received by the processor 26, with documentation related to the claim that may be stored in a database, or the like. In some embodiments, in addition to the alert, the processor 26 may generate audio or visual data to guide the user to collect additional information that may be related to the potential fraud.

In addition to providing insight with regard to potential fraud, in some embodiments, the augmented reality system 12 described above may be provided to clients or property owners as a tool to collect information regarding damaged property prior to a visit by a claims adjuster. This, direct-to-consumer approach may enable insurance providers to assess the severity of damaged property more quickly without physically visiting the property. Moreover, the consumer may be equipped to provide details with regard to the initial condition of the damaged item and the subsequent collateral damage (if any) due to the delay of the claim adjuster's visit, repair personnel or the like. In addition, the obtained image data by the client may be provided to the cloud-computing device or other suitable device to determine certain maintenance that the client can implement to prevent additional damage from occurring. In some embodiments, the consumer may use the augmented reality system 12 and walk through the house or property location. As the wearable electronic device collects image data, the consumer can be notified of interior areas and items that need to be repaired before the damage spreads based on the image recognition and analysis techniques performed by the augmented reality system 12 or other suitable computing device. As a result, the consumer may reduce preventable claims, as well as reduce frequency and severity of claims that do occur.

Additionally, the augmented reality system 12 may be employed by the consumer to collect inventory information regarding the items that the consumer owns prior to an event, such as a move or damage creating incident. The inventory information may assist the claims adjuster to determine the items that the consumer owned to determine a correct estimate for the items. In addition, the inventory information may provide additional records to prevent the consumer from fraudulently claiming that he owned items that were not recorded in the image data acquired by the wearable electronic device. In addition, the image data may be used to assess a condition of an item owned by the consumer, such that the claims adjuster may appropriately assign a replacement cost to the item in light of its condition. Accordingly, these direct-to-consumer use cases also include providing the ability for a client to virtually document their items. Creating an inventory list of items in their house, storage, or auto properties will then assist the client in the event of a loss or move.

Figure 5:
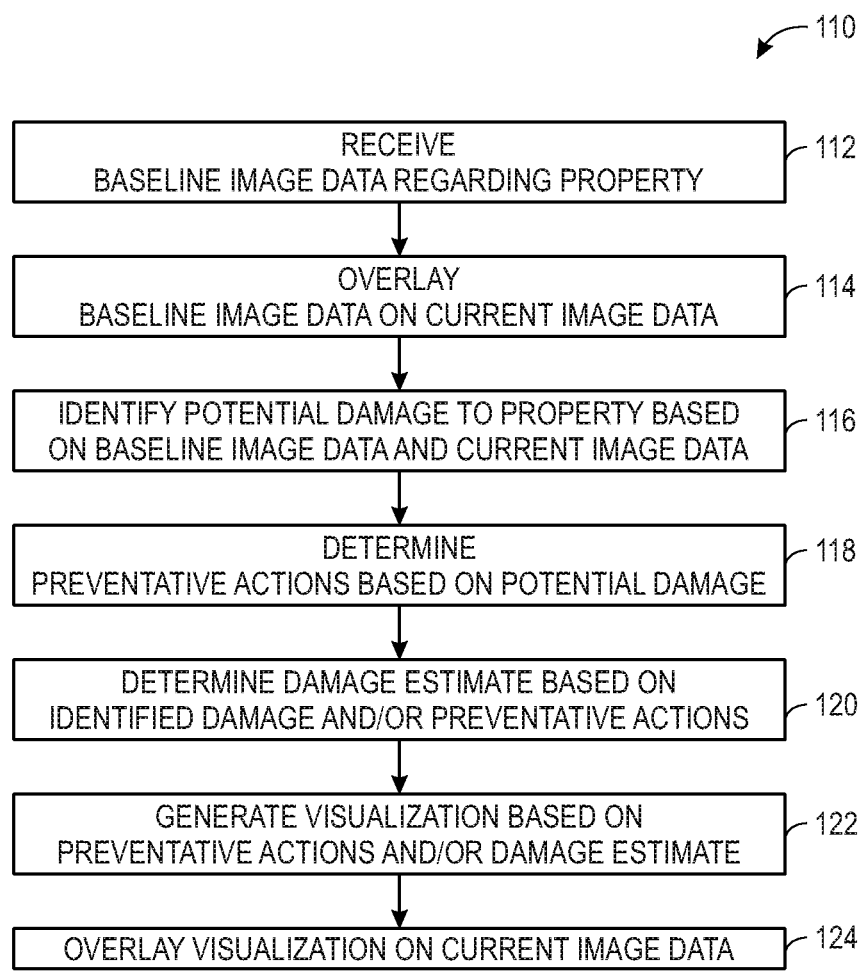
FIG. 5 illustrates a flow chart of a method for providing recommendations and estimates to a user via the augmented reality system of FIG. 1, in accordance with embodiments described herein.

With this in mind, FIG. 5 illustrates a flow chart of a method 110 for providing recommendations and estimates to a user via the augmented reality system 12. Like the methods 70 and 90 described above, it should be noted that the method 110 described below is described as being performed by the processor 26 of the augmented reality system 12 but may be performed by other suitable computing devices. In addition, although the method 110 is described in a particular order, it should be understood that the method 110 may be performed in any suitable order.

Generally, the method 110 described herein details a process that a client or owner of an insurance policy to assist the client in identifying actions to perform to reduce the amount of damage that may be sustained by property owned by the client. In addition, the method 110 may enable the client to recall the pieces of property that may have been present in a structure that may be part of a claim.

With the foregoing in mind and referring to FIG. 5, at block 112, the processor 26 may receive baseline image data related to a property associated with the client. The baseline image data may correspond to a condition of pieces of property located inside and outside a structure at a certain point in time. The baseline image data may also serve as an inventory of items that may be present inside or outside the structure at a certain point in time. In some embodiments, the baseline image data may include video or image data acquired while the client walks or traverses across different rooms or locations relative to the structure.

At block 114, the processor 26 may overlay the baseline image data on the current image data presented via the display 32. The current image data may correspond to image data acquired by the image sensor 28 in real time or at a time after the baseline image data was acquired.

By overlaying the baseline image data on the current image data, at block 116, the processor 26 may identify damage that may have occurred to different objects that are present on the baseline image data and the current image data. In some embodiments, when the baseline image data is overlaid over the current image data, the processor 26 may acquire image data regarding different objects present in both image datasets. For example, the processor 26 may analyze differences in the image datasets to determine whether objects present in the image datasets changed or became damaged. If the processor 26 detects that the condition or visible attributes (e.g., color, shape, configuration) of the object changes based on a comparison of the two image datasets, the processor 26 may query the image database 14 to determine a type of damage or an explanation with regard to how the condition of the object changed.

At block 118, the processor 26 may determine one or more preventative actions that the client may perform in the future to avoid the damage identified at block 116. The preventative actions may be determined by the processor 26 by querying the electronic news sources 18 or some other suitable data source (e.g., database) to determine preventative actions for certain types of damage.

At block 120, the processor 26 may determine an estimated costs to repair the damage based on the identified damage. In one embodiment, the processor 26 may query the financial database 16 or some other suitable component to determine the estimated costs for repairing the damage. The processor 26 may also solicit estimates for repairing the damage by sending out inquiries to one or more organizations with the image data that includes the damage. The image data may include measurement data, as described above with reference to FIG. 4, along with notes that may provide additional details related to the damaged property. In some embodiments, notes may be acquired via audio data provided by the client or adjuster. The notes may be added as a visualization over the image data that includes the damaged property. The organization may return (e.g., email, message) a quote or estimated amount for repairing the damaged property.

In some embodiments, the processor 26 may provide multi-layered decisions based on the received image data and audio data to create an estimate for the damaged property. By way of example, the multi-layered decisions may be related to making an item identification, obtaining measurement of damages, deciding to repair or replace the item/interior space based on the amount of damage, provide an automatic connection to a shopping experience with pricing and purchase locations, and the like.

At block 122, the processor 26 may generate a visualization that includes the preventative actions, the damage estimate, or both. The visualization may then, at block 124, be overlaid on the image data currently depicted via the display 36. In this way, the client may be more informed and aware of the expected costs for repairing items. In addition, the data acquired during the method 110 may also serve to create documentation that the appraiser or adjuster may use to initiate a claims process without physically visiting the client's property, thereby expediting the claims process.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
 a headset display;
 one or more image sensors disposed on the headset display, wherein the one or more image sensors are configured to acquire environment image data representative of an environment; and
 a processor configured to:
   receive the environment image data representative of an environment from the one or more image sensors;
   receive audio data correlated to a portion of the environment image data;
   identify the portion of the environment image data based on the audio data;
   detect, within the portion of the environment image data, property image data corresponding to one or more pieces of property;
   determine whether the one or more pieces of property are damaged based on a comparison of the property image data and a plurality of images stored in an image database;
   determine dimension data associated with the one or more pieces of property that are determined to be damaged, wherein the dimension data is determined using one or more infrared sensors configured to measure a distance between two or more points on the one or more pieces of property;
   generate a visualization indicative of damage to the one or more pieces of property, wherein the visualization comprises the dimension data;
   overlay the visualization on the portion of the environment image data; and
   present the visualization and the portion of the environment image data in the headset display.

2. The system of claim 1, wherein the headset display comprises a transparent glass.

3. The system of claim 1, wherein the processor is configured to transmit the property image data to a cloud-computing device, wherein the cloud-computing device is configured to determine the damage based on image recognition technology and the property image data.

4. The system of claim 1, wherein the processor is configured to determine the damage by comparing the property image data to the plurality of images in the image database using image recognition technology.

5. The system of claim 1, wherein the processor is configured to determine one or more types of damage sustained by the one or more pieces of property based on the property image data and the plurality of images in the image database using image recognition technology.

6. The system of claim 5, wherein the processor is configured to:
 receive additional audio data indicative of the one or more types of damage sustained by the one or more pieces of property; and
 update the visualization based on the one or more types of damage.

7. The system of claim 1, wherein the processor is configured to determine one or more types of products that correspond to the one or more pieces of property based on the property image data and the plurality of images in the image database using image recognition technology.

8. The system of claim 7, wherein the processor is configured to update the visualization based on the one or more types of products.

9. A method, comprising:
 receiving, via a processor, audio data associated with one or more pieces of property;
 identifying, via the processor, one or more documents associated with a policy related to the one or more pieces of property based on the audio data, wherein the one or more documents are identified based on a detection, in the audio data, of one or more key words associated with the one or more pieces of property;
 generating, via the processor, one or more visualizations based on the one or more documents;
 presenting, via the processor, the one or more visualizations over image data associated with the one or more pieces of property using an electronic display;
 receiving, via the processor, an indication of two points on the one or more pieces or property;
 receiving, via the processor, sensor data associated with a distance between each of the two points and the processor, wherein the sensor data is acquired by an infrared sensor;
 determining, via the processor, an additional distance between the two points based on the sensor data;
 generating, via the processor, an additional visualization representative of the additional distance; and
 overlaying, via the processor, the additional visualization over the image data in the electronic display.

10. The method of claim 9, wherein the one or more key words are associated with a request associated with the one or more documents.

11. The method of claim 9, comprising:
 receiving additional audio data associated with the one or more documents; and
 populating one or more fields of the one or more documents based on the additional audio data.

12. The method of claim 9, comprising:
 determining whether the one or more pieces of property are damaged based on the image data and a plurality of images stored in an image database;
 generating a visualization indicative of damage to the one or more pieces of property;
 overlaying the visualization on the image data; and
 presenting the visualization and the image data in the electronic display.

13. The method of claim 9, wherein the electronic display comprises an optical headset configured to receive the image data and generate the one or more visualizations configured to augment the image data.

14. The method of claim 9, wherein the electronic display comprises a wearable device configured to present the one or more visualizations over the image data in an augmented reality.

15. A non-transitory computer-readable medium comprising computer-executable instructions that when executed causes a processor to:
- receive baseline image data representing one or more portions of a structure via an image sensor at a first time;
- overlay the baseline image data over image data acquired by the image sensor after the baseline image data was acquired, wherein the image data is representative of the one or more portions of the structure;
- identify damage to one or more portions of the structure based on a comparison between the baseline image data and the image data;
- determine measurement data associated the one or more portions of the structure, wherein the measurement data is determined based on infrared data acquired from one or more infrared sensors, and wherein the measurement data comprises a distance between two or more points on the one or more portions of the structure;
- determine an estimate of costs associated with the damage based on the identified damage, wherein the estimate of costs is determined based on the distance between two or more points on the one or more portions of the structure;
- generate a visualization based on the estimate; and
- overlay the visualization over the image data for display on an electronic headset display.

16. The non-transitory computer-readable medium of claim 15, wherein the computer-executable instructions cause the processor to:
- determine one or more preventative actions based on the damage; and generate an additional visualization based on the one or more preventative actions; and
- overlay the additional visualization over the image data for display on the electronic headset display.

17. The non-transitory computer-readable medium of claim 16, wherein the computer-executable instructions cause the processor to determine the estimate of the damage based on the damage by sending a request for the estimate to a plurality of organizations, wherein the request comprises the image data.

18. The non-transitory computer-readable medium of claim 17, wherein the computer-executable instructions cause the processor to identify the damage to the one or more portions of the structure by:
- receiving audio data regarding the one or more portions of the structure present in the image data;
- identifying one or more portions of the image data that includes the one or more portions of the structure based on the audio data; and
- determining whether the one or more portions of the structure are damaged based on the one or more portions of the image data and a plurality of images stored in an image database.

19. The non-transitory computer-readable medium of claim 15, wherein the electronic headset display comprises a transparent glass.

* * * * *